(12) United States Patent
Sakamoto et al.

(10) Patent No.: US 10,119,580 B2
(45) Date of Patent: Nov. 6, 2018

(54) CONTROL APPARATUS FOR VEHICLE

(71) Applicant: TOYOTA JIDOSHA KABUSHIKI KAISHA, Toyota-shi, Aichi-ken (JP)

(72) Inventors: Kazuya Sakamoto, Toyota (JP); Atsushi Ayabe, Toyota (JP); Hiromitsu Nitani, Nagakute (JP); Hiroki Kondo, Miyoshi (JP); Kenji Matsuo, Toyota (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 15/327,087

(22) PCT Filed: Jul. 24, 2015

(86) PCT No.: PCT/IB2015/001387
§ 371 (c)(1),
(2) Date: Jan. 18, 2017

(87) PCT Pub. No.: WO2016/012855
PCT Pub. Date: Jan. 28, 2016

(65) Prior Publication Data
US 2017/0159729 A1 Jun. 8, 2017

(30) Foreign Application Priority Data

Jul. 28, 2014 (JP) ................................ 2014-153353

(51) Int. Cl.
*F16D 48/06* (2006.01)
*F16H 61/00* (2006.01)
(Continued)

(52) U.S. Cl.
CPC ......... *F16D 48/062* (2013.01); *F16D 48/066* (2013.01); *F16H 37/0846* (2013.01);
(Continued)

(58) Field of Classification Search
CPC ................ F16D 48/062; F16D 48/066; F16D 2500/10412; F16D 11/10;
(Continued)

(56) References Cited

U.S. PATENT DOCUMENTS 9,689,491 B2 * 6/2017 Ito ........................... F16H 61/12
9,821,806 B2 * 11/2017 Shimazu ............. B60W 30/181
(Continued)

FOREIGN PATENT DOCUMENTS

| JP | 2011-202749 A | 10/2011 |
| JP | 2012-086596 A | 5/2012 |
| WO | 2013/176208 A1 | 11/2013 |

*Primary Examiner* — David J Hlavka
(74) *Attorney, Agent, or Firm* — Oliff PLC

(57) ABSTRACT

A vehicle includes a continuously variable transmission, a gear mechanism and a controller. The continuously variable transmission and the gear mechanism are provided in parallel with each other between an input shaft and an output shaft. The controller is configured to i) when the vehicle travels in a state where both a first clutch and a third clutch provided on the gear mechanism side are released, gradually increase a hydraulic pressure of the first clutch such that the first clutch is engaged, ii) calculate a command hydraulic pressure for setting the first clutch to a pressure regulating state on the basis of a command hydraulic pressure of the first clutch at a timing at which the amount of change in an output-side rotation speed of the first clutch becomes larger than a predetermined value, and iii) control the first clutch by using the calculated command hydraulic pressure.

5 Claims, 8 Drawing Sheets

(51) Int. Cl.
*F16H 37/08* (2006.01)
*F16H 61/30* (2006.01)
*F16H 37/02* (2006.01)
*F16D 11/00* (2006.01)

(52) U.S. Cl.
CPC ............ *F16H 61/00* (2013.01); *F16H 61/30* (2013.01); *F16D 11/00* (2013.01); *F16D 2500/1026* (2013.01); *F16D 2500/1088* (2013.01); *F16D 2500/10412* (2013.01); *F16D 2500/10462* (2013.01); *F16D 2500/30417* (2013.01); *F16D 2500/30428* (2013.01); *F16D 2500/501* (2013.01); *F16D 2500/50239* (2013.01); *F16D 2500/50251* (2013.01); *F16H 37/022* (2013.01); *F16H 2037/026* (2013.01); *F16H 2037/0873* (2013.01); *F16H 2061/0087* (2013.01)

(58) Field of Classification Search
CPC . F16D 2500/10462; F16D 2500/50251; F16D 2500/50239; F16D 2500/501; F16D 2500/1088; F16D 2500/30428; F16D 2500/30417; F16D 2500/1026; F16H 61/30; F16H 37/0846; F16H 2037/0873
See application file for complete search history.

(56) References Cited

U.S. PATENT DOCUMENTS

| | | | |
|---|---|---|---|
| 9,970,522 B2 * | 5/2018 | Fujita | F16H 37/0846 |
| 2014/0371998 A1 * | 12/2014 | Moorman | B60W 10/10 701/53 |
| 2015/0087463 A1 | 3/2015 | Nakagawa et al. | |
| 2015/0233432 A1 * | 8/2015 | Biggs | F16D 48/062 701/67 |
| 2015/0321674 A1 * | 11/2015 | Ohashi | B60W 30/188 701/67 |

* cited by examiner

CONTROL APPARATUS FOR VEHICLE

BACKGROUND OF THE INVENTION

1. Field of the Invention

The invention relates to a control apparatus for a vehicle including a continuously variable transmission mechanism and a gear mechanism provided in parallel with each other between an engine and a drive wheel.

2. Description of Related Art

There is well known a power transmission system including a continuously variable transmission mechanism and a gear mechanism provided in parallel with each other between an input rotating member and an output rotating member. The gear mechanism has a gear stage. The power of an engine is transmitted to the input rotating member. The output rotating member outputs the power to a drive wheel. This is, for example, a power transmission system for a vehicle, described in International Application Publication No. 2013/176208. International Application Publication No. 2013/176208 describes the power transmission system for a vehicle, including a power transmission path through a belt-type continuously variable transmission and a power transmission path through a gear train. The power transmission paths are provided in parallel with each other between an input shaft and an output shaft. A first clutch and a dog clutch are provided in the power transmission path through the gear train. The first clutch transmits or interrupts power. A second clutch is provided in the power transmission path through the continuously variable transmission. The second clutch transmits or interrupts power. In this power transmission system for a vehicle, the speed ratio of the power transmission path through the gear train is set so as to be lower than the lowest vehicle speed-side speed ratio (maximum speed ratio) that can be established by the power transmission path through the continuously variable transmission. Thus, when the vehicle starts moving, the first clutch is engaged, and the power of the engine is transmitted by the power transmission path through the gear train, with the result that the vehicle is driven.

Incidentally, there may be a deviation between a command hydraulic pressure and an actual hydraulic pressure in hydraulic control over the first clutch or there may be a case where the first clutch does not operate as intended in response to an actual hydraulic pressure. In such a case, for example, at a designed command hydraulic pressure (designed hydraulic pressure) at which the first clutch should become a pressure regulating state, there is a possibility that the first clutch does not actually become the pressure regulating state. If it happens, in control that uses the first clutch (for example, in garage control for engaging the first clutch as a result of changing a shift lever from N position to D position or in returning from neutral control for slipping or releasing the first clutch during a stop of the vehicle), there is a concern that an engagement shock of the first clutch occurs or increases. The above-described inconvenience is not publicly known. The pressure regulating state is a state where it is possible to control a clutch torque (torque capacity) in response to a supplied hydraulic pressure from the timing (touch point) at which the piston of a clutch begins to contact a friction plate (clutch plate).

SUMMARY OF THE INVENTION

The invention appropriately calculates a command hydraulic pressure for, in a vehicle including a continuously variable transmission mechanism and a gear mechanism provided in parallel with each other between an input rotating member and an output rotating member, setting a first clutch that establishes a first power transmission path via the gear mechanism, to a pressure regulating state.

An aspect of the invention provides a control apparatus for a vehicle. The vehicle includes an engine, a drive wheel, an input rotating member, an output rotating member, a continuously variable transmission mechanism, a gear mechanism, a clutch mechanism, and a power transmission system. Power of the engine is transmitted to the input rotating member. The output rotating member is configured to output the power to the drive wheel. The gear mechanism has a gear stage. The continuously variable transmission mechanism and the gear mechanism are provided in parallel with each other between the input rotating member and the output rotating member. The clutch mechanism is configured to selectively change a torque transmission path between a first path and a second path. The first path is a path configured to transmit the power of the engine to the drive wheel via the gear mechanism. The second path is a path configured to transmit the power of the engine to the drive wheel via the continuously variable transmission mechanism. The clutch mechanism includes a first clutch and a second clutch. The first clutch is provided in the first path. The second clutch is provided in the second path. The power transmission system includes a third clutch. The third clutch is arranged in the first path between the first clutch and the output rotating member. The control apparatus includes: at least one electronic control unit configured to, when the vehicle travels by using the power that is transmitted through the second path in a state where both the first clutch and the third clutch are released, i) gradually increase a hydraulic pressure of the first clutch such that the first clutch is engaged, ii) calculate a command hydraulic pressure for setting the first clutch to a pressure regulating state on the basis of a command hydraulic pressure of the first clutch at a timing at which the amount of change in an output-side rotation speed of the first clutch becomes larger than a predetermined value, and iii) control the first clutch by using the calculated command hydraulic pressure.

With this configuration, by determining the amount of change in the output-side rotation speed of the first clutch, to which no torque is transmitted through the first power transmission path via the gear mechanism, it becomes easy to determine a change in the output-side rotation speed of the first clutch resulting from the fact that the first clutch becomes the pressure regulating state and has a torque capacity together with the fact that the inertia of the rotating member between the first clutch and the third clutch is small and the behavior of the rotating member early changes. Thus, in the vehicle including the continuously variable transmission mechanism and the gear mechanism provided in parallel with each other between the input rotating member and the output rotating member, it is possible to appropriately calculate the command hydraulic pressure for setting the first clutch to the pressure regulating state.

In the above aspect, the electronic control unit may be configured to, in a state where a change in rotation of the input rotating member is suppressed through shift control over the continuously variable transmission mechanism, gradually increase the hydraulic pressure of the first clutch such that the first clutch is engaged. In the above aspect, the electronic control unit may be configured to control the first clutch by using the command hydraulic pressure calculated in a period during which the amount of change in a rotation state of the input rotating member is smaller than or equal to a predetermined amount.

In the above aspect, the amount of change in the output-side rotation speed of the first clutch may be an amount of change after the output-side rotation speed of the first clutch has increased due to a drag of the first clutch caused by input-side rotation of the first clutch.

In the above aspect, the third clutch may be a dog clutch. With this configuration, when the third clutch is released, the influence of rotation of the output rotating member on the rotation speed of the rotating member between the first clutch and the third clutch is avoided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of the invention will be described in detail with reference to the accompanying drawings.

Figure 1:
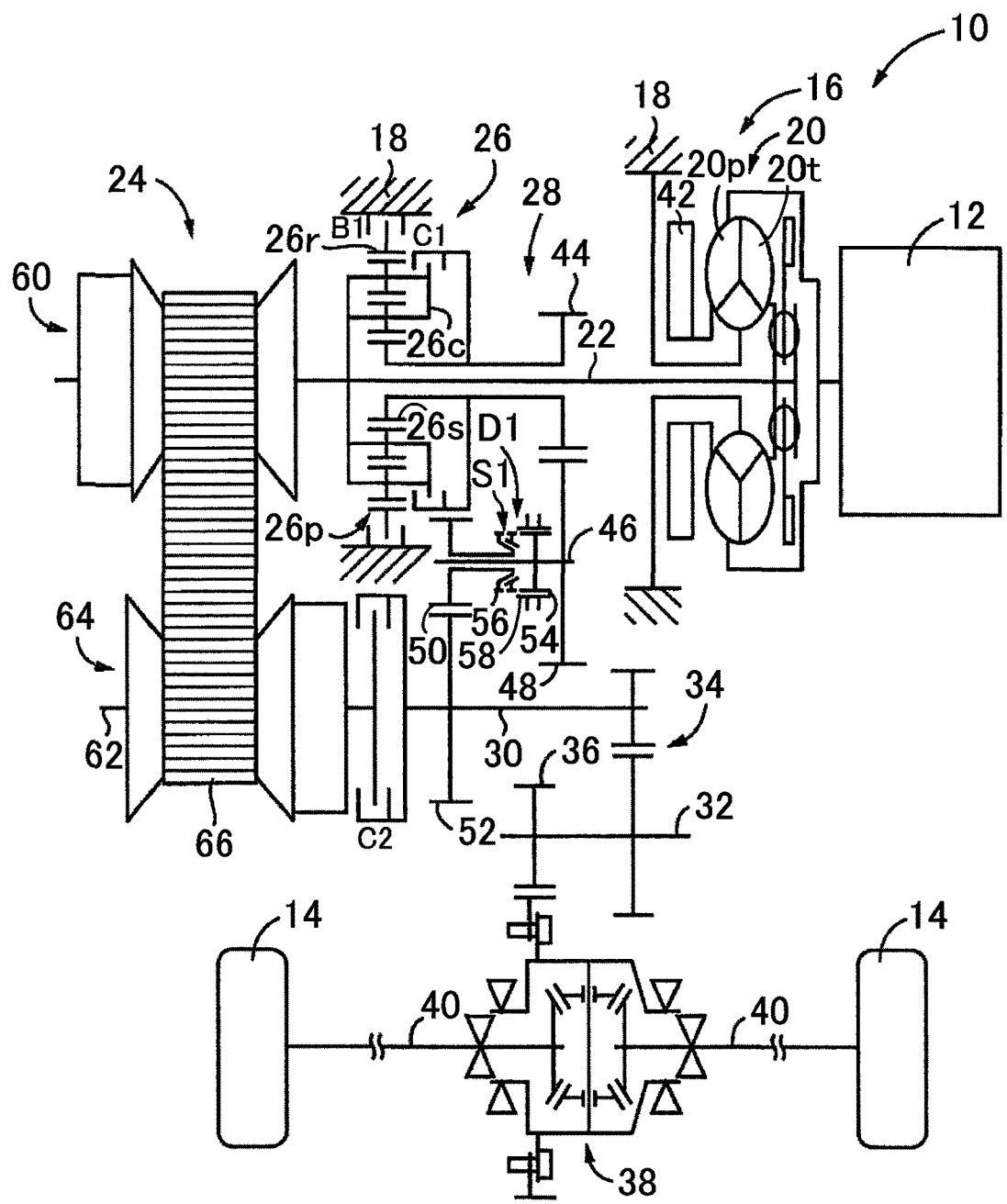
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The output shaft 30 is an output rotating member common to the continuously variable transmission 24 and the gear mechanism 28. The reduction gear unit 34 is formed of a pair of gears. The pair of gears are respectively provided on the output shaft 30 and the counter shaft 32 so as to be relatively non-rotatable, and are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear mechanism 28), the reduction gear unit 34, the differential gear 38, the axles 40, and the like.

In this way, the power transmission system 16 includes the continuously variable transmission 24 and the gear mechanism 28 provided in parallel with each other between the engine 12 (which is synonymous with the input shaft 22 that is an input rotating member to which the power of the engine 12 is transmitted) and the drive wheels 14 (which are synonymous with the output shaft 30 that is an output rotating member that outputs the power of the engine 12 to the drive wheels 14). Thus, the power transmission system 16 includes a first power transmission path and a second power transmission path. The first power transmission path transmits the power of the engine 12 from the input shaft 22 to the drive wheels 14 side (that is, the output shaft 30) via the gear mechanism 28. The second power transmission path transmits the power of the engine 12 from the input shaft 22 to the drive wheels 14 side (that is, the output shaft 30) via the continuously variable transmission 24. The power transmission system 16 is configured to change the power transmission path between the first power transmission path and the second power transmission path on the basis of a traveling state of the vehicle 10. Therefore, the power transmission system 16 includes clutch mechanisms that selectively change the power transmission path, which transmits the power of the engine 12 to the drive wheels 14 side, between the first power transmission path and the second power transmission path. The clutch mechanisms include a forward clutch C1, a reverse brake B1 and a CVT drive clutch C2. The forward clutch C1 and the reverse brake B1 serve as a first clutch that connects or interrupts the first power transmission path (in other words, a first clutch that establishes the first power transmission path when the first clutch is engaged). The CVT drive clutch C2 serves as a second clutch that connects or interrupts the second power transmission path (in other words, a second clutch that establishes the second power transmission path when the second clutch is engaged). The forward clutch C1, the reverse brake B1 and the CVT drive clutch C2 correspond to a separating device. Each of the CVT drive clutch C2, the forward clutch C1 and the reverse brake B1 is a known hydraulic friction engagement device (friction clutch) that is frictionally engaged by a hydraulic actuator. Each of the forward clutch C1 and the reverse brake B1 is one of elements that constitute the forward/reverse switching device 26, as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 42 is coupled to the pump impeller 20p. The oil pump 42 generates hydraulic pressure by being rotationally driven by the engine 12. The hydraulic pressure is used to control a shift of the continuously variable transmission 24, generate a belt clamping force in the continuously variable transmission 24, change the operation of each of the clutch mechanisms, or supply lubricating oil to portions of the power transmission path of the power transmission system 16.

The forward/reverse switching device 26 is provided around the input shaft 22 coaxially with the input shaft 22 in the first power transmission path. The forward/reverse switching device 26 includes a double-pinion-type planetary gear train 26p, the forward clutch C1 and the reverse brake B1. The planetary gear train 26p is a differential mechanism including three rotating elements, that is, a carrier 26c, a sun gear 26s and a ring gear 26r. The carrier 26c serves as an input element. The sun gear 26s serves as an output element. The ring gear 26r serves as a reaction element. The carrier 26c is integrally coupled to the input shaft 22. The ring gear 26r is selectively coupled to the housing 18 via the reverse brake B1. The sun gear 26s is coupled to a small-diameter gear 44. The small-diameter gear 44 is provided around the input shaft 22 coaxially with the input shaft 22 so as to be relatively rotatable. The carrier 26c and the sun gear 26s are selectively coupled to each other via the forward clutch C1. Thus, the forward clutch C1 is the clutch mechanism that selectively couples two of the three rotating elements to each other. The reverse brake B1 is the clutch mechanism that selectively couples the reaction element to the housing 18.

The gear mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear mechanism 28 is the gear mechanism having a gear ratio (gear stage) as a predetermined gear ratio (gear stage) in the power transmission path between the input shaft 22 and the output shaft 30. A dog clutch D1 is further provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 functions as a third clutch. The third clutch is arranged in a power transmission path between the forward/reverse switching device 26 (which is synonymous with the first clutch) and the output shaft 30, and establishes the first power transmission path when the third clutch is engaged together with the first clutch. The dog clutch D1 is included in the clutch mechanisms.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. Internal teeth on the inner periphery of the sleeve 58 are spline-fitted to external teeth on the outer periphery of the clutch hub 54. The internal teeth on the inner periphery of the sleeve 58 are meshed with external teeth of the clutch gear 56 when the sleeve 58 is moved toward the clutch gear 56. When the sleeve 58 that is constantly rotated integrally with the clutch hub 54 is meshed with the clutch gear 56, the idler gear 50 and the gear mechanism counter shaft 46 are connected to each other. The dog clutch D1 includes a known synchromesh mechanism Si that serves as a synchronization mechanism. The synchromesh mechanism Si synchronizes rotations at the time of fitting the sleeve 58 to the clutch gear 56. In the thus configured dog clutch D1, the sleeve 58 is slidably moved in a direction parallel to the axis of the gear mechanism counter shaft 46. Thus, the dog clutch D1 is changed between an engaged state and a released state.

In the power transmission system 16, when the forward clutch C1 (or the reverse brake B1) and the dog clutch D1 both are engaged in the first power transmission path, a forward power transmission path (or a reverse power transmission path) is established. Thus, the power of the engine 12 is transmitted from the input shaft 22 to the output shaft 30 via the gear mechanism 28. In the power transmission system 16, when at least both the forward clutch C1 and the reverse brake B1 are released or at least the dog clutch D1 is released, the first power transmission path is set to a neutral state (power transmission interrupted state) where transmission of power is interrupted.

The continuously variable transmission 24 is provided in a power transmission path between the input shaft 22 and the output shaft 30. The continuously variable transmission 24 includes a primary pulley 60, a secondary pulley 64 and a transmission belt 66. The primary pulley 60 is provided on the input shaft 22, and has a variable effective diameter. The secondary pulley 64 is provided on a rotary shaft 62 coaxial with the output shaft 30, and has a variable effective diameter. The transmission belt 66 is wound around the pair of variable pulleys 60, 64 so as to span between the pair of variable pulleys 60, 64. Power is transmitted via a friction force between the pair of variable pulleys 60, 64 and the transmission belt 66. In the continuously variable transmission 24, when the winding diameter (effective diameter) of the transmission belt 66 is changed as a result of a change in the V-groove width of each of the pair of pulleys 60, 64, a speed ratio (gear ratio) γ (=Input shaft rotation speed Nin/Output shaft rotation speed Nout) is continuously changed. The CVT drive clutch C2 is provided on the drive wheels 14 side with respect to the continuously variable transmission 24 (that is, the CVT drive clutch C2 is provided between the secondary pulley 64 and the output shaft 30). The CVT drive clutch C2 selectively connects the secondary pulley 64 (rotary shaft 62) to the output shaft 30 or disconnects the secondary pulley 64 (rotary shaft 62) from the output shaft 30. In the power transmission system 16, when the CVT drive clutch C2 is engaged in the second power transmission path, the power transmission path is established. Thus, the power of the engine 12 is transmitted from the input shaft 22 to the output shaft 30 via the continuously variable transmission 24. In the power transmission system 16, when the CVT drive clutch C2 is released, the second power transmission path is set to a neutral state.

Figure 2:
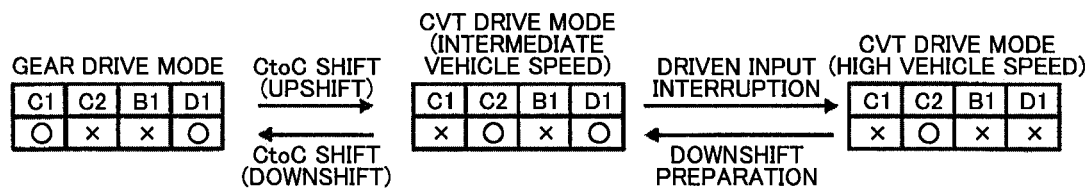
FIG. 2 is a view for illustrating changes in driving pattern of a power transmission system.

The operation of the power transmission system 16 will be described below. FIG. 2 is a view for illustrating changes in driving pattern (drive mode) of the power transmission system 16 by using an engagement chart of engagement elements for each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, "O" indicates an engaged (connected) state, and "x" indicates a released (disconnected) state.

Initially, a gear drive mode that is the driving pattern in which the power of the engine 12 is transmitted to the output shaft 30 via the gear mechanism 28 (that is, the driving pattern in which power is transmitted through the first power transmission path) will be described. In this gear drive mode, as shown in FIG. 2, for example, the forward clutch C1 and the dog clutch D1 are engaged, while the CVT drive clutch C2 and the reverse brake B1 are released.

Specifically, when the forward clutch C1 is engaged, the planetary gear train 26p that constitutes the forward/reverse switching device 26 is integrally rotated, so the small-diameter gear 44 is rotated at the same rotation speed as the input shaft 22. The small-diameter gear 44 is in mesh with the large-diameter gear 48 provided on the gear mechanism counter shaft 46, so the gear mechanism counter shaft 46 is also rotated similarly. The dog clutch D1 is engaged, so the gear mechanism counter shaft 46 and the idler gear 50 are connected to each other. The idler gear 50 is in mesh with the output gear 52, so the output shaft 30 provided integrally with the output gear 52 is rotated. In this way, when the forward clutch C1 and the dog clutch D1 are engaged, the power of the engine 12 is transmitted to the output shaft 30 sequentially via the torque converter 20, the forward/reverse switching device 26, the gear mechanism 28, and the like. In this gear drive mode, for example, when the reverse brake B1 and the dog clutch D1 are engaged, and the CVT drive clutch C2 and the forward clutch C1 are released, reverse traveling is enabled.

Subsequently, a CVT drive mode (continuously variable shift drive mode) that is the driving pattern in which the power of the engine 12 is transmitted to the output shaft 30 via the continuously variable transmission 24 (that is, the driving pattern in which power is transmitted through the second power transmission path) will be described. In this CVT drive mode, as shown in the CVT drive mode (high vehicle speed) of FIG. 2, for example, the CVT drive clutch C2 is engaged, while the forward clutch C1, the reverse brake B1 and the dog clutch D1 are released.

Specifically, when the CVT drive clutch C2 is engaged, the secondary pulley 64 and the output shaft 30 are connected to each other, so the secondary pulley 64 and the output shaft 30 are integrally rotated. In this way, when the CVT drive clutch C2 is engaged, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, the constituent members (for example, pinion gears) of the planetary gear train 26p, and the like, at a high vehicle speed.

The gear drive mode is, for example, selected in a low vehicle speed region including a state during a stop of the vehicle. A gear ratio $\gamma 1$ that is established by the first power transmission path (that is, a gear ratio EL that is established by the gear mechanism 28) is set to a value larger than (that is, a gear ratio lower than) a maximum gear ratio that can be established by the second power transmission path (that is, the lowest gear ratio that is the lowest vehicle speed-side gear ratio that is established by the continuously variable transmission 24) $\gamma max$. For example, the gear ratio $\gamma 1$ corresponds to a first-speed gear ratio $\gamma 1$ that is the gear ratio of a first gear stage in the power transmission system 16, and the lowest gear ratio $\gamma max$ of the continuously variable transmission 24 corresponds to a second-speed gear ratio $\gamma 2$ that is the gear ratio of a second gear stage in the power transmission system 16. Therefore, for example, the gear drive mode and the CVT drive mode are changed in accordance with a shift line for changing the gear stage between the first gear stage and the second gear stage in a shift map of a known stepped transmission. For example, in the CVT drive mode, a shift (for example, a CVT shift, a continuously variable shift) is carried out. In this shift, the gear ratio $\gamma$ is changed on the basis of a traveling state, such as an accelerator operation amount and a vehicle speed, by using a known technique. In changing the driving pattern from the gear drive mode to the CVT drive mode (high vehicle speed) or changing the driving pattern from the CVT drive mode (high vehicle speed) to the gear drive mode, the change is carried out via a CVT drive mode (intermediate vehicle speed) shown in FIG. 2 transitionally.

For example, when the driving pattern is changed from the gear drive mode to the CVT drive mode (high vehicle speed), the driving pattern is transitionally changed from the gear drive mode to the CVT drive mode (intermediate vehicle speed). The gear drive mode is the state where the forward clutch C1 and the dog clutch D1 are engaged. The CVT drive mode (intermediate vehicle speed) is the state where the CVT drive clutch C2 and the dog clutch D1 are engaged. That is, a clutch engagement changing shift (for example, clutch-to-clutch shift (hereinafter, referred to as CtoC shift)) is carried out so as to release the forward clutch C1 and engage the CVT drive clutch C2. At this time, the power transmission path is changed from the first power transmission path to the second power transmission path, and the power transmission system 16 is substantially upshifted. After the power transmission path is changed, the dog clutch D1 is released in order to prevent an unnecessary drag of the gear mechanism 28, or the like, or high-speed rotation in the planetary gear train 26p (see interruption of driven input in FIG. 2). In this way, the dog clutch D1 functions as a driven input interrupting clutch that interrupts input from the drive wheels 14 side.

For example, when the driving pattern is changed from the CVT drive mode (high vehicle speed) to the gear drive mode, the driving pattern is transitionally changed from the CVT drive mode (high vehicle speed) to the CVT drive mode (intermediate vehicle speed) in preparation for changing the driving pattern to the gear drive mode (see downshift preparation in FIG. 2). The CVT drive mode (high vehicle speed) is the state where the CVT drive clutch C2 is engaged. The CVT drive mode (intermediate vehicle speed) is the state where the CVT drive clutch C2 is engaged and the dog clutch D1 is further engaged. In the CVT drive mode (intermediate vehicle speed), rotation is also transmitted to the sun gear 26s of the planetary gear train 26p via the gear mechanism 28. When a clutch engagement changing shift (for example, CtoC shift) is carried out so as to release the CVT drive clutch C2 and engage the forward clutch C1 from the state of the CVT drive mode (intermediate vehicle speed), the driving pattern is changed to the gear drive mode. At this time, the power transmission path is changed from the second power transmission path to the first power transmission path, and the power transmission system 16 is substantially downshifted.

Figure 3:
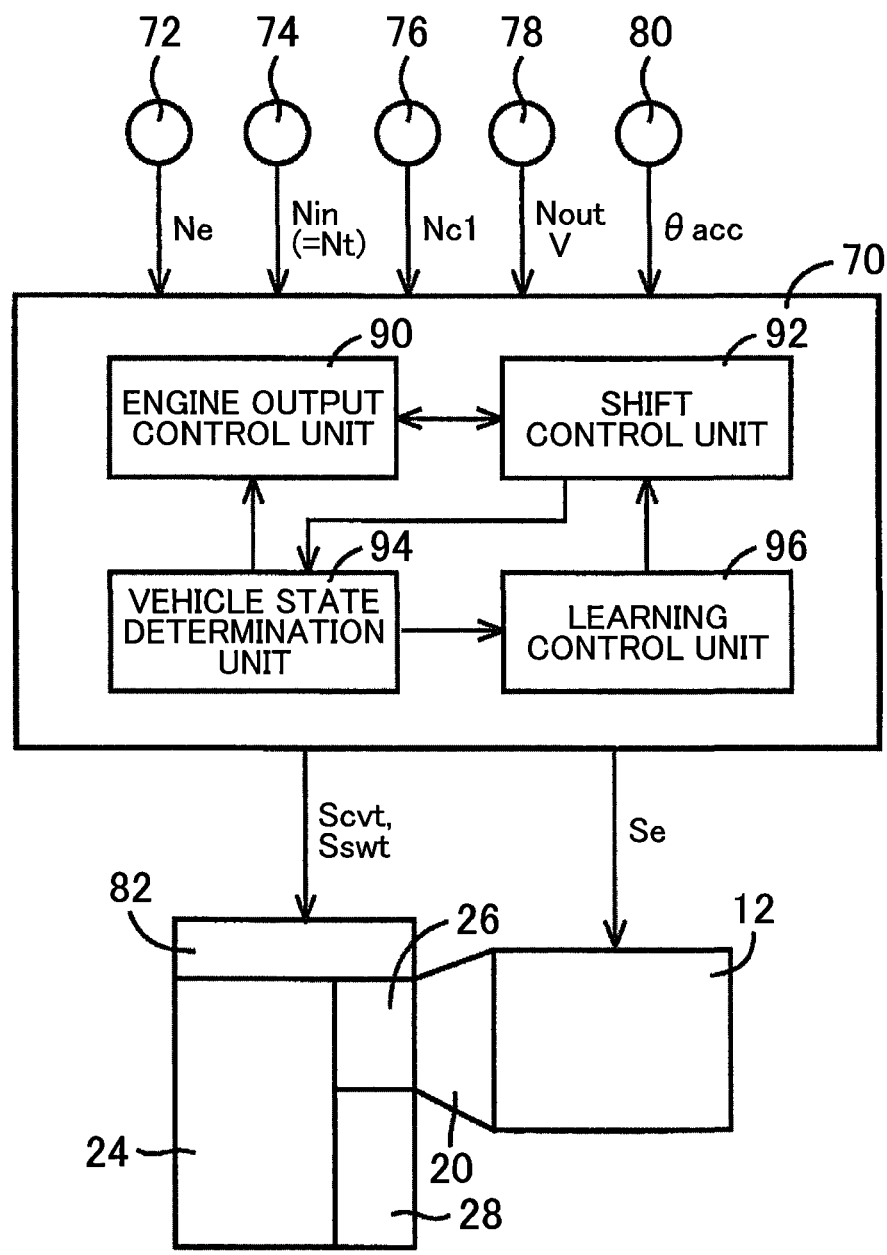
FIG. 3 is a view that illustrates a relevant portion of control functions and control system for various controls in the vehicle.

FIG. 3 is a view that illustrates a relevant portion of control functions and control system for various controls in the vehicle 10. As shown in FIG. 3, the vehicle 10 includes an electronic control unit 70 including, for example, a control unit for the vehicle 10. The control unit changes the driving pattern of the power transmission system 16. Thus, FIG. 3 is a view that shows input/output lines of the electronic control unit 70, and is a functional block diagram that illustrates a relevant portion of control functions implemented by the electronic control unit 70. The electronic control unit 70 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 70 is configured to execute output control over the engine 12, shift control and belt clamping force control over the continuously variable transmission 24, control for changing the driving pattern of the power transmission system 16, and the like. Where necessary, the electronic control unit 70 is split into an electronic control unit for controlling the engine, an electronic control unit for controlling hydraulic pressure, and the like.

Various actual values based on detection signals of various sensors of the vehicle 10 are supplied to the electronic control unit 70. The various sensors include, for example, various rotation speed sensors 72, 74, 76, 78, an accelerator operation amount sensor 80, and the like. The various actual values include, for example, an engine rotation speed Ne, an input shaft rotation speed Nin, a C1 output rotation speed Nc1, an output shaft rotation speed Nout, an accelerator operation amount θacc, and the like. The input shaft rotation speed Nin is a turbine rotation speed Nt. The C1 output rotation speed Nc1 is the rotation speed of the output-side rotating member of the forward clutch C1. The output shaft rotation speed Nout corresponds to the vehicle speed V. The accelerator operation amount θacc is the operation amount of an accelerator operation member as a driver's acceleration request amount. An engine output control command signal Se, a hydraulic control command signal Scvt, a hydraulic control command signal Sswt, and the like, are output from the electronic control unit 70. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the power transmission system 16. For example, command signals (command pressures) for respectively driving solenoid valves that control hydraulic pressures that are supplied to hydraulic actuators (not shown) of the forward clutch C1, the reverse brake B1, the CVT drive clutch C2 and the dog clutch D1 are output to a hydraulic control circuit 82 as the hydraulic control command signal Sswt.

The electronic control unit 70 includes an engine output control unit 90, that is, engine output control means, and a shift control unit 92, that is, shift control means. The invention may be implemented by using a plurality of electronic control units.

The engine output control unit 90, for example, calculates a required driving force Fdem on the basis of the accelerator operation amount θacc and the vehicle speed V by using a correlation (for example, a driving force map) empirically obtained or obtained by design and stored in advance (that is, predetermined). The engine output control unit 90 outputs, to a throttle actuator, a fuel injection device, an ignition device, and the like, the engine output control command signal Se for outputting an engine torque Tetgt by which the required driving force Fdem is obtained.

In the CVT drive mode, for example, the shift control unit 92 determines a command hydraulic pressure (hydraulic control command signal Scvt) of each of hydraulic pressures respectively supplied to the hydraulic actuators of the primary pulley 60 and secondary pulley 64 on the basis of the accelerator operation amount θacc, the vehicle speed V, and the like, from a predetermined correlation (for example, a CVT shift map, a belt clamping force map). The command hydraulic pressures are intended to achieve a target gear ratio γtgt of the continuously variable transmission 24 while a belt slip of the continuously variable transmission 24 does not occur. The target gear ratio γtgt is set so that the operating point of the engine 12 is on a predetermined optimal line (for example, an engine optimal fuel consumption line). The shift control unit 92 outputs those command hydraulic pressures to the hydraulic control circuit 82, and carries out a CVT shift.

The shift control unit 92 controls a change of the driving pattern between the gear drive mode and the CVT drive mode. Specifically, for example, the shift control unit 92 determines whether to shift (change the gear ratio) on the basis of the vehicle speed V and the accelerator operation amount θacc by using an upshift line and a downshift line for changing the gear ratio between the first-speed gear ratio γ1 and the second-speed gear ratio γ2. The shift control unit 92 determines whether to change the driving pattern in which the vehicle is traveling on the basis of the determined result. The first-speed gear ratio corresponds to the gear ratio EL in the gear drive mode. The second-speed gear ratio corresponds to the lowest gear ratio γmax in the CVT drive mode. The upshift line and the downshift line are, for example, predetermined shift lines, and have a predetermined hysteresis.

When the shift control unit 92 determines to change the driving pattern, the shift control unit 92 changes the driving pattern. For example, when the shift control unit 92 determines to upshift in the gear drive mode, the shift control unit 92 changes the driving pattern from the gear drive mode to the CVT drive mode (high vehicle speed). When the shift control unit 92 changes the driving pattern from the gear drive mode to the CVT drive mode (high vehicle speed), the shift control unit 92 initially carries out an upshift through a CtoC shift for releasing the forward clutch C1 and engaging the CVT drive clutch C2. This state corresponds to the CVT drive mode (intermediate vehicle speed) to which the driving pattern is transitionally changed in FIG. 2. The power transmission path in the power transmission system 16 is changed from the first power transmission path, through which power is transmitted via the gear mechanism 28, to the second power transmission path, through which power is transmitted via the continuously variable transmission 24. Subsequently, the shift control unit 92 changes the driving pattern to the CVT drive mode (high vehicle speed) by outputting a command to actuate the sleeve 58 such that the engaged dog clutch D1 is released.

When the shift control unit 92 determines to downshift in the CVT drive mode (high vehicle speed), the shift control unit 92 changes the driving pattern from the CVT drive mode (high vehicle speed) to the gear drive mode. When the shift control unit 92 changes the driving pattern from the CVT drive mode (high vehicle speed) to the gear drive mode, the shift control unit 92 initially changes the driving pattern to the CVT drive mode (intermediate vehicle speed) by outputting a command to actuate the sleeve 58 such that the released dog clutch D1 is engaged. Subsequently, the shift control unit 92 carries out a downshift through a CtoC shift for releasing the CVT drive clutch C2 and engaging the forward clutch C1. This state corresponds to the gear drive mode in FIG. 2. The power transmission path in the power transmission system 16 is changed from the second power transmission path, through which power is transmitted via the continuously variable transmission 24, to the first power transmission path, through which power is transmitted via the gear mechanism 28. In this way, when the shift control unit 92 changes transmission of power from transmission of power via the continuously variable transmission 24 to transmission of power via the gear mechanism 28 while the vehicle 10 is traveling, the shift control unit 92 actuates the dog clutch D1 to an engaged side and then releases the CVT drive clutch C2.

In change control for changing the driving pattern between the gear drive mode and the CVT drive mode, the change is carried out via the CVT drive mode (intermediate vehicle speed) transitionally, so the first power transmission path and the second power transmission path are changed only by exchanging torque through a CtoC shift. Therefore, a change shock is suppressed.

For example, when a predetermined condition is established during a stop of the vehicle in a state where the first power transmission path is established, the shift control unit 92 starts neutral control for limiting transmission of power through the first power transmission path by outputting, to the hydraulic control circuit 82, a command hydraulic pressure (hydraulic control command signal Sswt) for setting the engaged forward clutch C1 to a semi-engaged state or a released state. Thus, the shift control unit 92 reduces the idling load of the engine 12. The predetermined condition for executing the above-described neutral control, for example, includes the condition that the shift lever position is D position, the condition that the accelerator is off, the condition that a wheel brake is on, the condition that the engine 12 is at an idle, and the like.

For example, when a garage shift (a change from N position to D position or a change from N position to R position) is carried out, the shift control unit 92 executes garage control for smoothly engaging the first clutch (C1 or B1) by outputting, to the hydraulic control circuit 82, a command hydraulic pressure (hydraulic control command signal Sswt) for changing an engagement transitional hydraulic pressure of the forward clutch C1 (at the time of a change from N position to D position) or the reverse brake B1 (at the time of a change from N position to R position) in accordance with a predetermined rule. Thus, the shift control unit 92 suppresses a shock at the time when the first clutch is engaged. In the garage shift, the shift lever is operated from N position to D position or R position during a stop of the vehicle.

Incidentally, in hydraulic pressure control over the first clutch (hereinafter, the forward clutch C1 for the sake of convenience), there is a possibility that an actual hydraulic pressure corresponding to a command hydraulic pressure (hydraulic control command signal Sswt) is not output and, as a result, the forward clutch C1 does not operate as intended in response to the command hydraulic pressure. Even when an actual hydraulic pressure corresponding to a command hydraulic pressure is output, if the forward clutch C1 does not operate in response to the actual hydraulic pressure, there is a possibility that the forward clutch C1 does not operated as intended in response to the command hydraulic pressure eventually. For example, at a predetermined command hydraulic pressure (designed hydraulic pressure) at which the forward clutch C1 should become a pressure regulating state, there is a possibility that the forward clutch C1 does not actually become the pressure regulating state. If it happens, in control that uses the forward clutch C1, for example, at the time of the CtoC shift in changing from the CVT drive mode (intermediate vehicle speed) to the gear drive mode, at the time of returning from the neutral control (at the time of cancelling the neutral control), in the garage control, or the like, there is a concern that an engagement shock of the forward clutch C1 occurs or increases.

During the CVT drive mode (high vehicle speed) in the state where the second power transmission path is established and the forward clutch C1 and the dog clutch D1 both are released, the electronic control unit 70 gradually increases the hydraulic pressure of the forward clutch C1 toward engagement of the forward clutch C1, and learns (calculates) a command hydraulic pressure for setting the forward clutch C1 to the pressure regulating state (hereinafter, referred to as a C1 pressure regulating state command hydraulic pressure) on the basis of the command hydraulic pressure of the forward clutch C1 at the timing at which the amount of change in the output-side rotation speed of the forward clutch C1 becomes larger than a predetermined value.

In this learning (calculation), during the CVT drive mode (high vehicle speed), the timing at which the forward clutch C1 has become the pressure regulating state is determined on the basis of the behavior of a rotating member A of which the rotation changes to approach the input shaft rotation speed Nin by controlling the forward clutch C1 toward engagement, and the C1 pressure regulating state command hydraulic pressure is learned (corrected) by using the command hydraulic pressure of the forward clutch C1 at that timing. The CVT drive mode (high vehicle speed) is the driving pattern in which no torque is input from the engine 12 side or the drive wheels 14 side to the rotating member A that constitutes the power transmission path between the forward clutch C1 and the dog clutch D1 because the forward clutch C1 and the dog clutch D1 both are released. When the forward clutch C1 becomes the pressure regulating state and has a torque capacity, the rotation speed of the rotating member A changes. However, because the inertia of the rotating member A is small in the power transmission system 16, a change in the behavior of the rotating member A is early, and it is easy to determine the pressure regulating state. Therefore, this learning control allows learning during the CVT drive mode (high vehicle speed) in which the forward clutch C1 is not used in the vehicle 10 including the continuously variable transmission 24 and the gear mechanism 28 provided in parallel with each other between the input shaft 22 and the output shaft 30, so it is particularly useful together with no influence on the CVT drive mode (high vehicle speed).

The rotating member A includes, for example, the output-side rotating member of the forward clutch C1, the small-diameter gear 44, the gear mechanism counter shaft 46, the large-diameter gear 48, the clutch hub 54, and the like. In learning of the above-described C1 pressure regulating state command hydraulic pressure, the output-side rotation speed of the forward clutch C1 is the rotation speed of the rotating member A, and is the C1 output rotation speed Nc1, the rotation speed of the small-diameter gear 44 or the large-diameter gear 48, or the like. Hereinafter, for the sake of convenience, the rotating member A is set as the output-side rotating member of the forward clutch C1, and the C1 output rotation speed Nc1 is used as the output-side rotation speed of the forward clutch C1.

Specifically, the electronic control unit 70 further includes vehicle state determination means, that is, a vehicle state determination unit 94, and learning control means, that is, a learning control unit 96.

The vehicle state determination unit 94, for example, determines whether it is the state where no torque is input to the rotating member A (that is, the state where the rotating member A is free, which is referred to as C1 free state). Specifically, when the driving pattern is set in the CVT drive mode (high vehicle speed) in which the forward clutch C1 and the dog clutch D1 both are released during the CVT drive mode, the vehicle state determination unit 94 determines that it is the C1 free state. When a predetermined time (for C1) or longer has elapsed from a command to release (release command) the forward clutch C1 and a predetermined time (for D1) or longer has elapsed from a command to release the dog clutch D1, the vehicle state determination unit 94 determines that the forward clutch C1 and the dog clutch D1 both are released. Each of the predetermined time (for C1) and the predetermined time (for D1) is, for example, a predetermined complete release determination time for making a determination that the clutch definitely becomes a released state from when the release command is output.

For example, when the vehicle state determination unit 94 determines that it is the C1 free state, the vehicle state determination unit 94 determines whether the condition for starting to learn the C1 pressure regulating state command hydraulic pressure is satisfied. Specifically, when the vehicle state is a predetermined vehicle steady state, when there is no command to engage the forward clutch C1 from a system other than the learning control unit 96 and when there is no command to engage the dog clutch D1, the vehicle state determination unit 94 determines that the condition for starting to learn the C1 pressure regulating state command hydraulic pressure is satisfied. In the predetermined vehicle steady state, a change in the vehicle speed V is suppressed (particularly, the vehicle speed V is set substantially constant) because of no driver's operation (for example, accelerator operation, steering operation) or slow driver's operation, and learning is easily carried out. In addition, when a predetermined time or longer has elapsed after the vehicle state determination unit 94 determines that it is the C1 free state, the vehicle state determination unit 94 may determine that the condition for starting to learn the C1 pressure regulating state command hydraulic pressure is satisfied. The predetermined time is, for example, a predetermined time for determining that, after a change into the CVT drive mode (high vehicle speed), the CVT drive mode (high vehicle speed) is stabilized.

For example, when the vehicle state determination unit 94 determines that the condition for starting to learn the C1 pressure regulating state command hydraulic pressure is satisfied, the learning control unit 96 outputs, to the shift control unit 92, a learning engagement command for controlling the released forward clutch C1 toward an engaged state. In accordance with the learning engagement command, the shift control unit 92 outputs, to the hydraulic control circuit 82, a learning engagement command hydraulic pressure for gradually increasing the actual hydraulic pressure of the forward clutch C1 toward engagement of the forward clutch C1 as a command hydraulic pressure that is used in hydraulic control over the forward clutch C1 (hereinafter, referred to as C1 command hydraulic pressure). As the learning engagement command hydraulic pressure, for example, a high pressure command value for fast filling (rapid filling) is output until a lapse of a predetermined time from the start of output, and, subsequent to the high pressure command value, a constant standby pressure command value for waiting at a constant pressure lower than the high pressure command value is output until a lapse of a predetermined time. Furthermore, subsequent to the constant standby pressure command value, a hydraulic pressure command value is output. In the hydraulic pressure command value, the high pressure command value and the constant standby pressure command value are repeated at a change in a predetermined stepwise form for gradually increasing the hydraulic pressure. Alternatively, subsequent to the constant standby pressure command value, a hydraulic pressure command value that gradually increases at a predetermined gradient for gradually increasing the hydraulic pressure is output.

For example, when the shift control unit 92 is outputting the learning engagement command hydraulic pressure, the vehicle state determination unit 94 determines whether the forward clutch C1 has become the pressure regulating state. Specifically, when the amount of change in the C1 output rotation speed Nc1 becomes larger than the predetermined value, the vehicle state determination unit 94 determines that the forward clutch C1 has become the pressure regulating state. The amount of change in the C1 output rotation speed Nc1 is, for example, the amount of change from the C1 output rotation speed Nc1 at the start of outputting the learning engagement command hydraulic pressure by the shift control unit 92. The C1 output rotation speed Nc1 is increased in response to the input shaft rotation speed Nin because of a drag of the forward clutch C1 even in the C1 free state. Thus, the C1 output rotation speed Nc1 at the start of outputting the learning engagement command hydraulic pressure is the C1 output rotation speed Nc1 increased by the drag. Therefore, the amount of change in the C1 output rotation speed Nc1 in determining the pressure regulating state is the amount of change from the amount of increase in the C1 output rotation speed Nc1, which occurs as a result of a drag of the forward clutch C1 due to the input-side rotation of the forward clutch C1 (for example, the rotation of the input shaft 22). The predetermined value is, for example, a predetermined pressure regulating state determination threshold for making a determination that the forward clutch C1 has become the pressure regulating state.

For example, when the vehicle state determination unit 94 determines that the forward clutch C1 has become the pressure regulating state, the learning control unit 96 learns the C1 pressure regulating state command hydraulic pressure on the basis of the C1 command hydraulic pressure (particularly, the learning engagement command hydraulic pressure) at the determination timing. Specifically, the learning control unit 96 corrects (changes) the C1 pressure regulating state command hydraulic pressure to the learning engagement command hydraulic pressure at the determination timing instead of the designed hydraulic pressure of the C1 pressure regulating state command hydraulic pressure (or the C1 pressure regulating state command hydraulic pressure after the last learning). Alternatively, the learning control unit 96 corrects (changes) the C1 pressure regulating state command hydraulic pressure at the actual hydraulic pressure (a detected value from a hydraulic pressure sensor (not shown)) of the forward clutch C1 in the pressure regulating state to the learning engagement command hydraulic pressure at the actual hydraulic pressure of the forward clutch C1 at the determination timing instead of the designed hydraulic pressure (or the C1 pressure regulating state command hydraulic pressure after the last learning).

For example, when the vehicle state determination unit 94 determines that the forward clutch C1 has become the pressure regulating state, the learning control unit 96 stops outputting the learning engagement command. As a result of the stop of output of the learning engagement command, the shift control unit 92 stops outputting the learning engagement command hydraulic pressure, and sets the forward clutch C1 in process of engagement to the released state.

The shift control unit 92 corrects the C1 command hydraulic pressure in control that uses the forward clutch C1 with reference to the C1 pressure regulating state command hydraulic pressure after learning by the learning control unit 96. Thus, the controllability of control that uses the forward clutch C1 is improved. For example, in CtoC shift, when the forward clutch C1 is engaged, control change timing, having a start point set to the timing at which the forward clutch C1 becomes the pressure regulating state, becomes appropriate, so the controllability is improved. In releasing the neutral control or in garage control, an engagement shock is reduced, and the responsiveness is improved.

Figure 4:
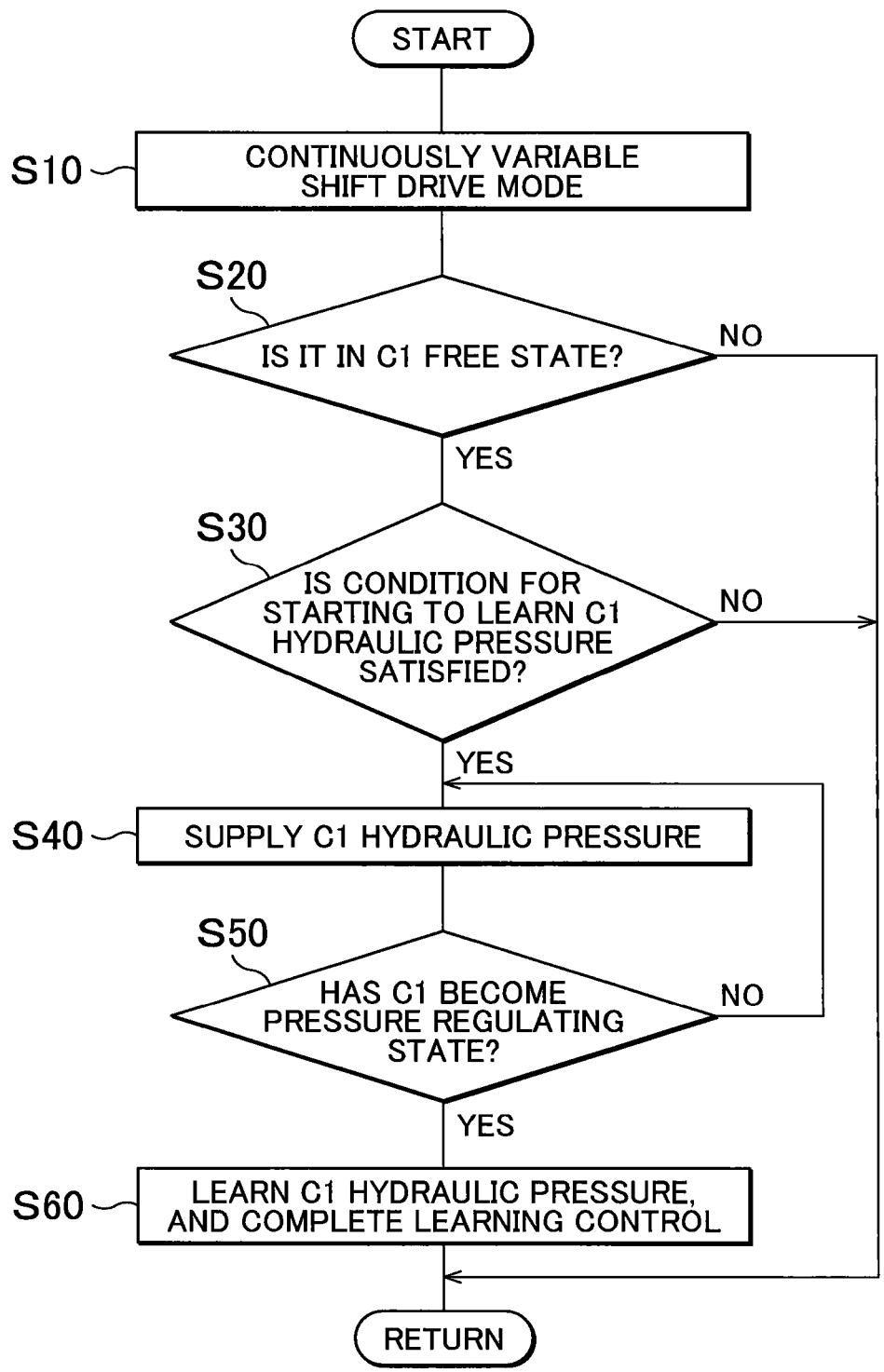
FIG. 4 is a flowchart that illustrates a relevant portion of control operations of an electronic control unit, that is, control operations for appropriately learning (calculating) a C1 pressure regulating state command hydraulic pressure.
Figure 5:
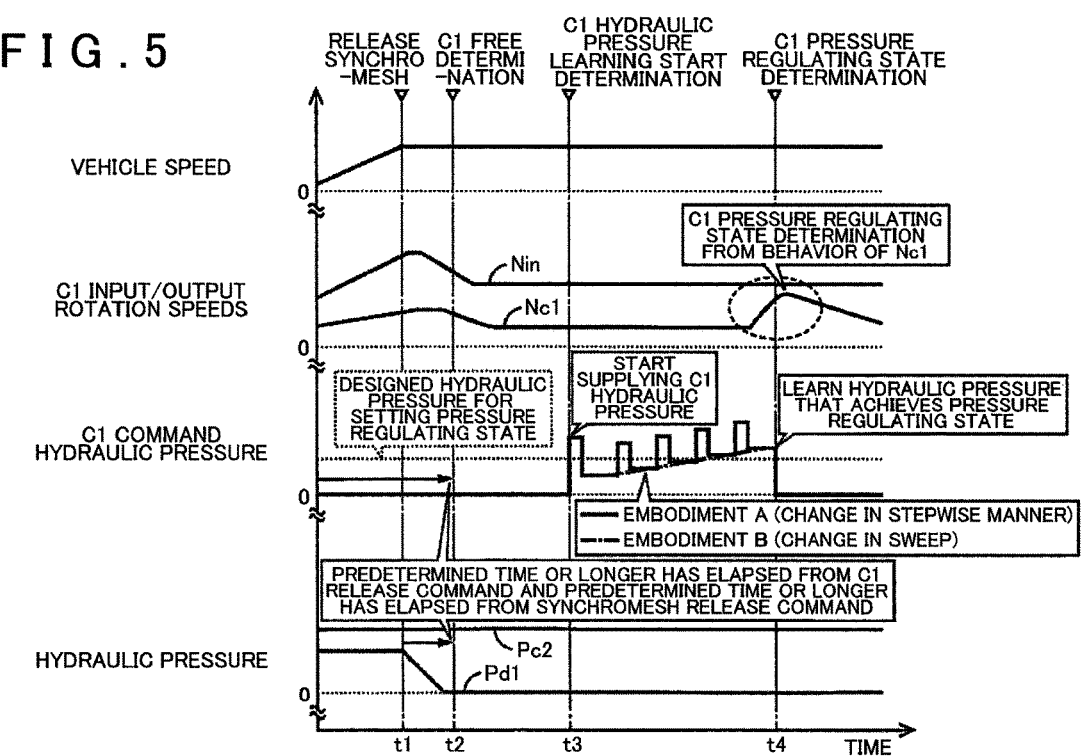
FIG. 5 is an example of a time chart in the case where the control operations shown in the flowchart of FIG. 4 are executed.

FIG. 4 is a flowchart that illustrates a relevant portion of control operations of the electronic control unit 70, that is, control operations for appropriately learning the C1 pressure regulating state command hydraulic pressure, and is, for example, repeatedly executed at an extremely short cycle time of about several milliseconds to several tens of milliseconds. FIG. 5 is an example of a time chart in the case where the control operations shown in the flowchart of FIG. 4 are executed.

In FIG. 4, initially, step (hereinafter, step is omitted) S10 corresponding to the shift control unit 92, for example, indicates that the driving pattern is set to the CVT drive mode. Subsequently, in S20 corresponding to the vehicle state determination unit 94, for example, it is determined whether it is in the C1 free state. When negative determination is made in S20, the routine is ended. When affirmative determination is made in S20 (see t2 timing in FIG. 5), in S30 corresponding to the vehicle state determination unit 94, for example, it is determined whether the condition for starting to learn the C1 pressure regulating state command hydraulic pressure is satisfied (see the t2 timing to t3 timing in FIG. 5). When negative determination is made in S30, the routine is ended. When affirmative determination is made in S30 (see the t3 timing in FIG. 5), in S40 corresponding to the learning control unit 96 and the shift control unit 92, for example, the learning engagement command is output, and the learning engagement command hydraulic pressure is output to the hydraulic control circuit 82 (see the t3 timing to t4 timing in FIG. 5). Subsequently, in S50 corresponding to the vehicle state determination unit 94, for example, it is determined whether the forward clutch C1 has become the pressure regulating state. When negative determination is made in S50, the process returns to S40. When affirmative determination is made in S50, in S60 corresponding to the learning control unit 96 and the shift control unit 92, for example, the C1 pressure regulating state command hydraulic pressure is learned on the basis of the learning engagement command hydraulic pressure at the determination timing at which affirmative determination is made in the above determination of S50 (see the t4 timing in FIG. 5). After completion of learning control, outputting the learning engagement command, which is carried out in S40, is stopped. Accordingly, outputting the learning engagement command hydraulic pressure is stopped, and the forward clutch C1 in process of engagement is set to the released state.

In FIG. 5, the t1 timing indicates that the command hydraulic pressure for releasing the dog clutch D1 during the CVT drive mode (intermediate vehicle speed) is output. The t2 timing indicates that it is determined that it is in the C1 free state because the predetermined time (for C1) or longer has elapsed from the command to release the forward clutch C1 and the predetermined time (for D1) or longer has elapsed from the command to release the dog clutch D1. After that, because it is determined at the t3 timing that the condition for starting to learn the C1 pressure regulating state command hydraulic pressure is satisfied, the learning engagement command hydraulic pressure is output. Embodiment A indicated by the continuous line, for example, indicates an example of the learning engagement command hydraulic pressure by which, subsequent to outputting the high pressure command value and the constant standby pressure command value, the hydraulic pressure command value by which the high pressure command value and the constant standby pressure command value are repeated at a change in a predetermined stepwise form is output. Embodiment B indicated by the alternate long and short dashed line, for example, indicates an example of the learning engagement command hydraulic pressure by which the hydraulic pressure command value that gradually increases at a predetermined gradient is output. When it is determined that the forward clutch C1 has become the pressure regulating state on the basis of a change in the C1 output rotation speed Nc1 at the t4 timing during a gradual increase in the actual hydraulic pressure of the forward clutch C1, the C1 pressure regulating state command hydraulic pressure is learned on the basis of the learning engagement command hydraulic pressure at that timing. After completion of learning control, outputting the learning engagement command hydraulic pressure is stopped, and the forward clutch C1 is released. As shown in FIG. 5, the C1 output rotation speed Nc1 is increased in response to the input shaft rotation speed Nin because of a drag of the forward clutch C1. Therefore, the amount of change in the C1 output rotation speed Nc1 in determining the pressure regulating state is the amount of change from the C1 output rotation speed Nc1 at the t3 timing, increased because of the drag. In FIG. 5, because the designed hydraulic pressure for achieving the pressure regulating state deviates from the learning engagement command hydraulic pressure at the timing at which it is determined that the pressure regulating state is achieved, the C1 pressure regulating state command hydraulic pressure is corrected (changed) to the learning engagement command hydraulic pressure at the determination timing instead of the designed hydraulic pressure. In the case of Embodiment A, when the learning engagement command hydraulic pressure at the timing at which it is determined that the pressure regulating state is achieved is the high pressure command value, the learning engagement command hydraulic pressure is read as the constant standby pressure command value following the high pressure command value.

As described above, according to the present embodiment, by determining the amount of change in the output-side rotation speed of the forward clutch C1, to which no torque is transmitted through the first power transmission path, it becomes easy to determine a change in the output-side rotation speed of the forward clutch C1 resulting from the fact that the forward clutch C1 becomes the pressure regulating state and has a torque capacity together with the fact that the inertia of the rotating member A between the forward clutch C1 and the dog clutch D1 is small and the behavior of the rotating member A early changes. Thus, in the vehicle 10, it is possible to appropriately learn the C1 pressure regulating state command hydraulic pressure.

According to the present embodiment, by learning the C1 pressure regulating state command hydraulic pressure in consideration of the influence of the amount of increase in the C1 output rotation speed Nc1 due to a drag of the forward clutch C1, the accuracy of the learning is improved.

According to the present embodiment, the third clutch that is arranged in the power transmission path between the forward clutch C1 and the output shaft 30 is the dog clutch D1. Therefore, when the dog clutch D1 is released, the influence of the rotation of the output shaft 30 on the rotation speed of the rotating member A between the forward clutch C1 and the dog clutch D1 is avoided.

Next, a second embodiment of the invention will be described. In the following description, like reference numerals denote portions common to the embodiments, and the description thereof is omitted.

In the above-described first embodiment, the C1 output rotation speed Nc1 is increased in response to the input shaft rotation speed Nin because of a drag of the forward clutch C1 even in the C1 free state. This means that, when the input shaft rotation speed Nin changes, the C1 output rotation speed Nc1 for the amount of the drag also changes. Therefore, in the above-described first embodiment, the condition for starting learning includes the condition that the vehicle state is placed in the predetermined vehicle steady state where the input shaft rotation speed Nin is hard to change during learning of the C1 pressure regulating state command hydraulic pressure. In the vehicle 10, in the CVT drive mode (high vehicle speed), it is possible to keep the input shaft rotation speed Nin substantially constant through shift control over the continuously variable transmission 24 irrespective of the vehicle speed V.

In the present embodiment, during the CVT drive mode (high vehicle speed), the electronic control unit 70 gradually increases the hydraulic pressure of the forward clutch C1 to engage the forward clutch C1 and learns the C1 pressure regulating state command hydraulic pressure in the state where a change in the rotation of the input shaft 22 is suppressed through shift control over the continuously variable transmission 24 (particularly, in the state where the input shaft rotation speed Nin is kept substantially constant). Therefore, in the present embodiment, the condition for starting to learn the C1 pressure regulating state command hydraulic pressure does not need to include the vehicle state where a change in the vehicle speed V is suppressed.

Specifically, for example, when the vehicle state determination unit 94 determines that the condition for starting to learn the C1 pressure regulating state command hydraulic pressure is satisfied, the learning control unit 96 outputs, to the shift control unit 92, a learning shift command for controlling the input shaft rotation speed Nin to a substantially constant value in advance of outputting the learning engagement command to the shift control unit 92. The shift control unit 92 outputs, to the hydraulic control circuit 82, a learning shift command hydraulic pressure as the hydraulic control command signal Scvt in accordance with the learning shift command. The learning shift command hydraulic pressure is used to shift the continuously variable transmission 24 such that the input shaft rotation speed Nin is kept constant.

For example, when the vehicle state determination unit 94 determines that the forward clutch C1 has become the pressure regulating state, the learning control unit 96 not only stops outputting the learning engagement command but also stops outputting the learning shift command. The shift control unit 92 carries out a CVT shift during normal times by, for example, outputting the hydraulic control command signal Scvt determined from a CVT shift map instead of the learning shift command hydraulic pressure as a result of a stop of outputting the learning shift command in addition to the mode of the above-described first embodiment.

Figure 6:
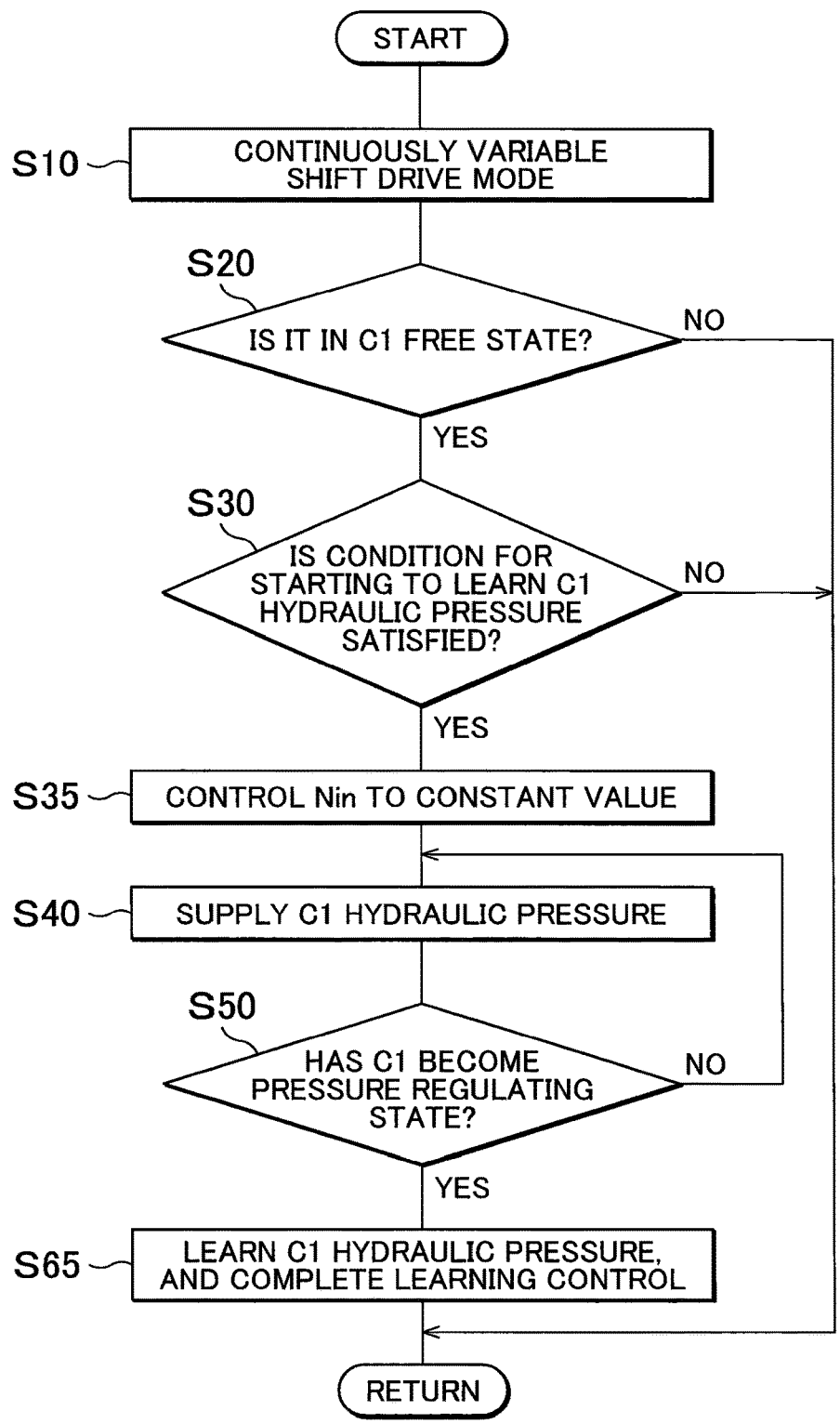
FIG. 6 is a flowchart that illustrates a relevant portion of control operations of the electronic control unit, that is, control operations for appropriately learning (calculating) a C1 pressure regulating state command hydraulic pressure according to an embodiment different from the flowchart of FIG. 4.
Figure 7:
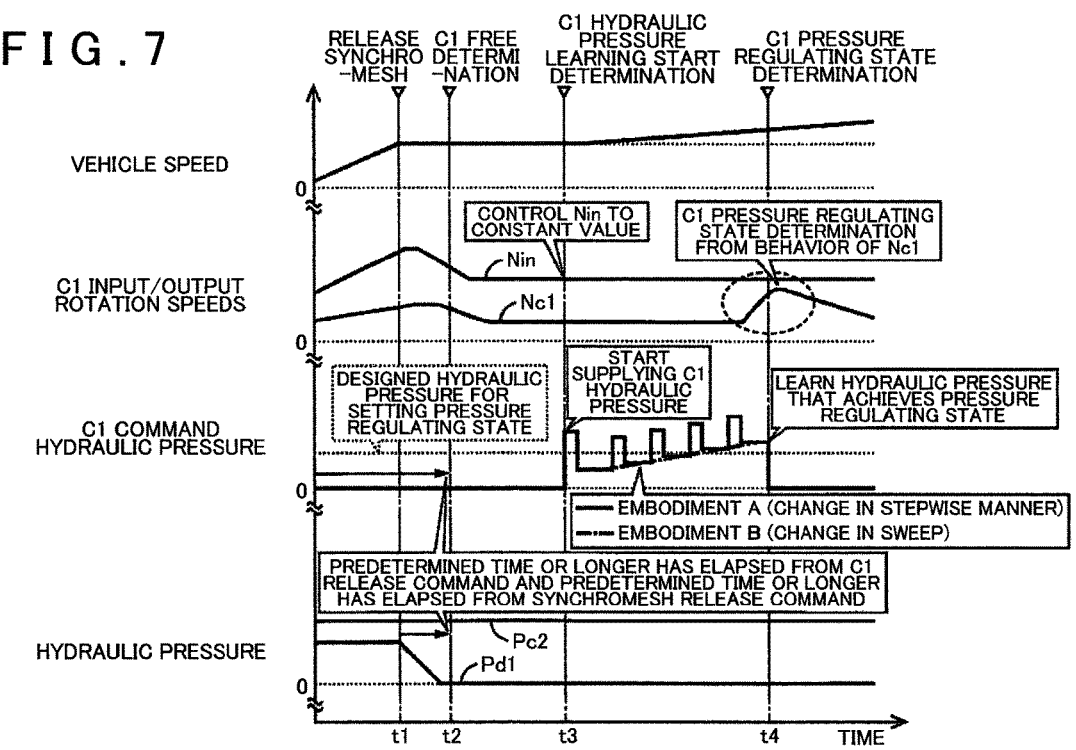
FIG. 7 is an example of a time chart in the case where the control operations shown in the flowchart of FIG. 6 are executed.

FIG. 6 is a flowchart that illustrates a relevant portion of control operations of the electronic control unit 70, that is, control operations for appropriately learning the C1 pressure regulating state command hydraulic pressure, and is, for example, repeatedly executed at an extremely short cycle time of about several milliseconds to several tens of milliseconds. FIG. 7 is an example of a time chart in the case where the control operations shown in the flowchart of FIG. 6 are executed. FIG. 6 shows an embodiment different from the flowchart of FIG. 4. FIG. 6 mainly differs from FIG. 4 in that S35 is added and S60 is changed to S65. Hereinafter, for FIG. 6 and FIG. 7, portions different from FIG. 4 and FIG. 5 will be mainly described.

In FIG. 6, when affirmative determination is made in S30 (see t3 timing in FIG. 7), in S35 corresponding to the learning control unit 96 and the shift control unit 92, for example, the learning shift command is output, and the learning shift command hydraulic pressure for controlling the input shaft rotation speed Nin to a constant value is output to the hydraulic control circuit 82 (see the t3 timing to t4 timing in FIG. 7). Subsequently, S40 is executed (see the t3 timing to the t4 timing in FIG. 7). Subsequently, S50 is executed. When affirmative determination is made in S50, in S65 corresponding to the learning control unit 96 and the shift control unit 92, for example, the C1 pressure regulating state command hydraulic pressure is learned on the basis of the learning engagement command hydraulic pressure at the determination timing at which affirmative determination is made in S50 (see the t4 timing in FIG. 7). After completion of learning control, outputting the learning shift command, which is carried out in S35, and outputting the learning engagement command, which is carried out in S40, are stopped. Accordingly, the forward clutch C1 in process of engagement is set to the released state by stopping outputting the learning engagement command hydraulic pressure, and a CVT shift during normal times is carried out by outputting the hydraulic control command signal Scvt determined from the CVT shift map instead of the learning shift command hydraulic pressure.

In FIG. 7, because it is determined that the condition for starting to learn the C1 pressure regulating state command hydraulic pressure is satisfied at the t3 timing, the learning shift command hydraulic pressure is output in advance of outputting the learning engagement command hydraulic pressure. Thus, at least during learning of the C1 pressure regulating state command hydraulic pressure from the t3 timing to the t4 timing, irrespective of a change in the vehicle speed V, the input shaft rotation speed Nin is kept substantially constant through a shift of the continuously variable transmission 24.

As described above, according to the present embodiment, in addition to the fact that similar advantageous effects to those of the above-described first embodiment, by learning the command hydraulic pressure for setting the first clutch to the pressure regulating state in the state where fluctuations in the rotation speed of the input rotating member are suppressed, the accuracy of the learning is improved. The fluctuations in the rotations peed of the input rotating member influence the output-side rotation speed of the first clutch because of a drag of the first clutch. By actively keeping the input shaft rotation speed Nin substantially constant through a shift of the continuously variable transmission 24, the condition for starting to learn the C1 pressure regulating state command hydraulic pressure is eased, and the opportunity to learn the C1 pressure regulating state command hydraulic pressure increases.

In the above-described first embodiment or second embodiment, the C1 pressure regulating state command hydraulic pressure is learned in the state where the input shaft rotation speed Nin is kept constant. However, there is a possibility that the input shaft rotation speed Nin is not always substantially constant or the input shaft rotation speed Nin cannot be controlled to a substantially constant value. In the above-described first embodiment or second embodiment, in calculating the amount of change in the C1 output rotation speed Nc1, the amount of increase in the C1 output rotation speed Nc1 due to a drag of the forward clutch C1 is taken into consideration. However, it is assumed that the input shaft rotation speed Nin is substantially constant, and the amount of increase is treated as a substantially constant value. In contrast, in a third embodiment, it is not assumed that the input shaft rotation speed Nin is substantially constant, and the amount of change in the C1 output rotation speed Nc1 is calculated in consideration of the amount of increase in the C1 output rotation speed Nc1 due to a drag of the forward clutch C1. The amount of increase in the C1 output rotation speed Nc1 changes in response to the input shaft rotation speed Nin.

Specifically, the vehicle state determination unit 94, for example, calculates an estimated value of the amount of increase in the C1 output rotation speed Nc1 due to a drag of the forward clutch C1 on the basis of an actual input shaft rotation speed Nin from a predetermined correlation (C1 drag amount map) between the input shaft rotation speed Nin and the amount of increase in the C1 output rotation speed Nc1 due to a drag of the forward clutch C1. In the present embodiment, the amount of change in the C1 output rotation speed Nc1, by which the pressure regulating state of the forward clutch C1 is determined, is not the amount of change from the C1 output rotation speed Nc1 at the start of outputting the learning engagement command hydraulic pressure by the shift control unit 92 but the amount of change from the estimated value of the amount of increase in the C1 output rotation speed Nc1 due to a drag.

Figure 8:
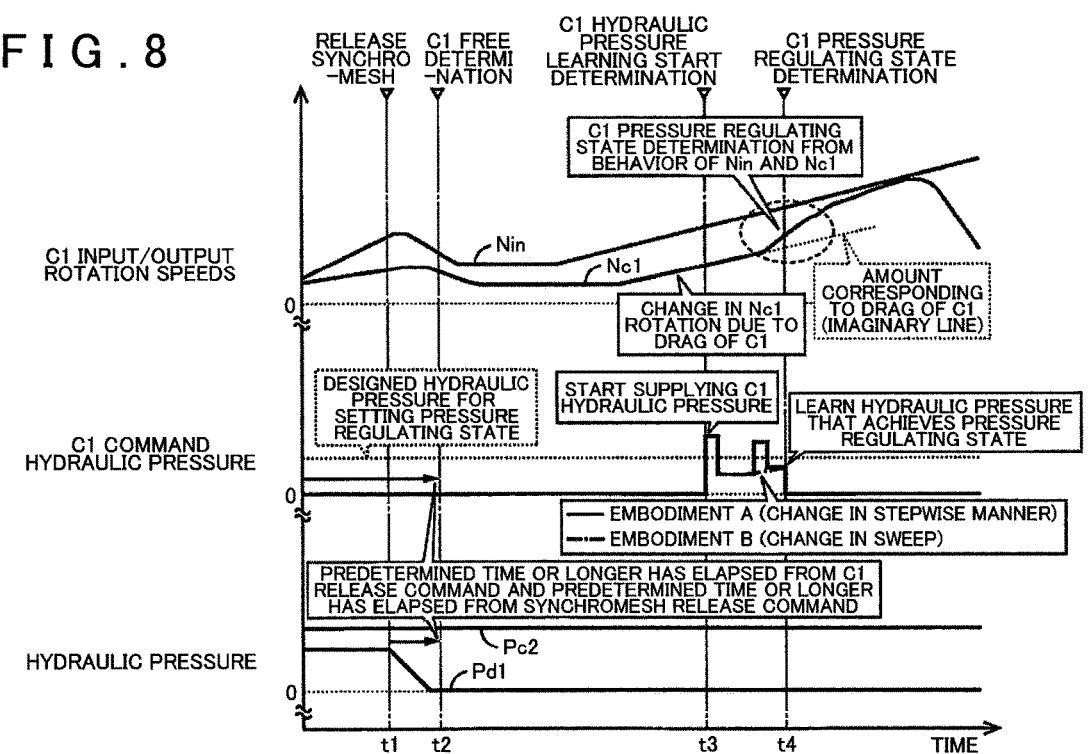
FIG. 8 is an example of a time chart in the case where the control operations shown in the flowchart of FIG. 4 are executed according to an embodiment different from the time chart of FIG. 5.

FIG. 8 is an example of a time chart in the case where the control operations shown in the flowchart of FIG. 4 are executed according to an embodiment different from the time chart of FIG. 5. In FIG. 8, the input shaft rotation speed Nin changes during learning of the C1 pressure regulating state command hydraulic pressure, and the amount of increase in the C1 output rotation speed Nc1 due to a drag of the forward clutch C1 as a result of the change is also changed. The pressure regulating state of the forward clutch C1 is determined on the basis of the amount of change (see the imaginary line indicated by the dotted line) from the estimated value of the amount of increase in the C1 output rotation speed Nc1 due to a drag, which is changed in response to a change in the input shaft rotation speed Nin.

As described above, according to the present embodiment, in addition to the fact that similar advantageous effects to those of the above-described first embodiment, even in the state where the input shaft rotation speed Nin fluctuates, by learning the C1 pressure regulating state command hydraulic pressure in consideration of the influence of the amount of increase in the C1 output rotation speed Nc1 due to a drag of the forward clutch C1, the accuracy of the learning is improved. Because it is not assumed that the input shaft rotation speed Nin is substantially constant, the opportunity to learn the C pressure regulating state command hydraulic pressure increases.

The embodiments of the invention are described in detail with reference to the accompanying drawings; however, the invention is also applied to other modes.

For example, in the above-described embodiments, each embodiment is independently implemented; however, each embodiment does not always need to be independently implemented. The above-described embodiments may be implemented in combination as needed. Specifically, in the above-described first embodiment, when the input shaft rotation speed Nin does not become substantially constant through a CVT shift in accordance with a change in the vehicle speed V or the CVT shift map, the mode of the above-described second embodiment or third embodiment may be applied. In the above-described second embodiment, when the input shaft rotation speed Nin cannot be kept substantially constant through a shift of the continuously variable transmission 24, the mode of the above-described third embodiment may be applied.

In the above-described embodiments, it is determined that the forward clutch C1 has become the pressure regulating state when the amount of change in the C1 output rotation speed Nc1 becomes larger than the predetermined value; however, the invention is not limited to this mode. For example, an increase in the amount of change in the C1 output rotation speed Nc1 is that the C1 output rotation speed Nc1 approaches the input shaft rotation speed Nin, and it may be determined that the forward clutch C1 has become the pressure regulating state when a differential rotation speed between the input shaft rotation speed Nin and the C1 output rotation speed Nc1 becomes smaller than a predetermined differential rotation speed. That is, the fact that the amount of change in the C1 output rotation speed Nc1 becomes larger than the predetermined value may be read as the fact that the differential rotation speed between the input shaft rotation speed Nin and the C1 output rotation speed Nc1 becomes smaller than the predetermined differential rotation speed.

In the above-described embodiments, the neutral control and the garage control are controls only illustrated as an example of control that uses the forward clutch C1, and the electronic control unit 70 does not need to have these functions. On the other hand, as the control that uses the forward clutch C1, for example, torque phase compensation control, model base control, control for raising the C1 output rotation speed Nc1; or the like, may be executed. In the torque phase compensation control, a drop of torque in a torque phase in process of a CtoC shift is compensated. In the model base control, a power-on shift is executed by using the equation of motion for calculating a torque capacity on the basis of a command hydraulic pressure. The control for raising the C1 output rotation speed Nc1 is executed to suppress a differential rotation speed in the dog clutch D1 before engagement of the dog clutch D1. According to the invention, it is possible to reduce a shift shock by setting an appropriate region in which torque phase compensation control is executed, to improve the accuracy of a change of model base control, to reduce a target hydraulic pressure in control for raising the C1 output rotation speed Nc1, and to shorten a time that is required to execute control for raising the C1 output rotation speed Nc1.

In the above-described embodiments, for the sake of convenience, learning control according to the invention is described on the assumption that the first clutch is the forward clutch C1; however, the invention may be applied when the first clutch is the reverse brake B1. In the case of the reverse brake B1, the direction in which rotation changes in process of engagement is opposite to that of the forward clutch C1; however, it is possible to determine that the reverse brake b1 has become the pressure regulating state by checking the amount of change (absolute value).

In the above-described embodiments, the third clutch that is arranged in the power transmission path between the forward clutch C1 and the output shaft 30 is the dog clutch D1; however, the third clutch is not limited to the dog clutch D1. The third clutch may be, for example, a friction engagement device. When the third clutch is a friction engagement device, there is a possibility that the rotation of the rotating member A between the forward clutch C1 and the dog clutch D1 increases because of a drag of the third clutch even when the third clutch is released; however, the C1 pressure regulating state command hydraulic pressure just needs to be learned in consideration of the influence of an increase in rotation due to a drag of the third clutch as in the case of consideration of the influence due to a drag of the forward clutch C1.

In the above-described embodiments, the gear mechanism 28 is a gear mechanism having a single gear stage; however, the gear mechanism 28 is not limited to this configuration. For example, the gear mechanism 28 may be a gear mechanism having a plurality of gear stages with different gear ratios γ. That is, the gear mechanism 28 may be a stepped transmission that is shifted into two or more stages.

In the above-described embodiments, in terms of the gear ratio γ, the gear mechanism 28 is the gear mechanism that establishes the gear ratio EL lower than the lowest gear ratio γmax of the continuously variable transmission 24; however, the gear mechanism 28 is not limited to this configuration. For example, the gear mechanism 28 may be a gear mechanism that establishes a gear ratio EH higher than the highest gear ratio γmin of the continuously variable transmission 24 and the lower gear ratio EL. The invention can also be applied to the thus configured gear mechanism 28. This also applies to the case where the gear mechanism 28 is a gear mechanism having a plurality of gear stages.

In the above-described embodiments, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a gear ratio that satisfies the required torque.

In the above-described embodiments, the engine 12 is illustrated as the driving force source; however, the invention is not limited to this configuration. For example, an internal combustion engine, such as a gasoline engine and a diesel engine, is used as the driving force source. Instead, another prime motor, such as an electric motor, may be employed in combination with the engine 12, as the driving force source. The power of the engine 12 is transmitted to the continuously variable transmission 24 or the gear mechanism 28 via the torque converter 20; however, the invention is not limited to this configuration. For example, instead of the torque converter 20, another fluid transmission device, such as a fluid coupling having no torque amplification function, may be used. Alternatively, the fluid transmission device is not necessarily provided.

The above-described embodiments are only illustrative, and the invention may be implemented in modes including various modifications or improvements on the basis of the knowledge of persons skilled in the art.

What is claimed is:

1. A control apparatus for a vehicle, the vehicle including
   an engine,
   a drive wheel,
   an input rotating member to which power of the engine is transmitted,
   an output rotating member configured to output the power to the drive wheel,
   a continuously variable transmission mechanism,
   a gear mechanism having a gear stage, the continuously variable transmission mechanism and the gear mechanism being provided in parallel with each other between the input rotating member and the output rotating member,
   a clutch mechanism configured to selectively change a torque transmission path between a first path and a second path, the first path being configured to transmit the power of the engine to the drive wheel via the gear mechanism, the second path being configured to transmit the power of the engine to the drive wheel via the continuously variable transmission mechanism, the clutch mechanism including a first clutch and a second clutch, the first clutch being provided in the first path, the second clutch being provided in the second path, and
   a power transmission system including a third clutch, the third clutch being arranged in the first path between the first clutch and the output rotating member, the control apparatus comprising:
   at least one electronic control unit configured to
   when the vehicle travels by using the power that is transmitted through the second path where both the first clutch and the third clutch are released,
   (i) gradually increase a hydraulic pressure of the first clutch such that the first clutch is engaged,
   (i) calculate a command hydraulic pressure for setting the first clutch to a pressure regulating state based on a command hydraulic pressure of the first clutch at a timing at which an amount of change in an output-side rotation speed of the first clutch becomes larger than a predetermined value, and
   (iii) control the first clutch by using the command hydraulic pressure.

2. The control apparatus according to claim 1, wherein
   the electronic control unit is configured to, where a change in rotation of the input rotating member is suppressed through shift control over the continuously variable transmission mechanism, gradually increase the hydraulic pressure of the first clutch such that the first clutch is engaged.

3. The control apparatus according to claim 1, wherein the electronic control unit is configured to control the first clutch by using the command hydraulic pressure calculated in a period during which the amount of change in a rotation state of the input rotating member is smaller than or equal to a predetermined amount.

4. The control apparatus according to claim 1, wherein the amount of change in the output-side rotation speed of the first clutch occurs after the output-side rotation speed of the first clutch has increased due to a drag of the first clutch caused by input-side rotation of the first clutch.

5. The control apparatus according to claim 1, wherein the third clutch is a dog clutch.

* * * * *